United States Patent [19]

Grosser et al.

[11] Patent Number: 4,893,259

[45] Date of Patent: Jan. 9, 1990

[54] STANDARDIZATION OF SPECTRAL LINES

[75] Inventors: Zoe A. Grosser, Fairfield; John B. Collins, Westport; Ewa M. Pruszkowski, Bethel, all of Conn.

[73] Assignee: The Perkin-Elmer Corporation, Norwalk, Conn.

[21] Appl. No.: 201,510

[22] Filed: Jun. 2, 1988

[51] Int. Cl.$^4$ .......................... G01J 3/36; G01N 21/64
[52] U.S. Cl. ..................................... 364/525; 356/307; 356/317; 356/326; 250/281
[58] Field of Search ........ 364/525; 356/307, 316–319, 356/326; 250/281, 282

[56] References Cited

U.S. PATENT DOCUMENTS

| 4,093,991 | 6/1978 | Christie, Jr. et al. | 364/525 |
| 4,239,390 | 12/1980 | Scherer | 356/307 |
| 4,300,833 | 11/1981 | Harnly et al. | 356/307 |
| 4,462,685 | 7/1984 | Smith, Jr. et al. | 356/307 |
| 4,560,275 | 12/1985 | Goetz | 356/326 |
| 4,622,468 | 11/1986 | Stefanski et al. | 356/317 |
| 4,632,549 | 12/1986 | Czabaffy et al. | 356/326 |
| 4,692,883 | 9/1987 | Nelson et al. | 364/525 |
| 4,779,216 | 10/1988 | Collins | 364/525 |

OTHER PUBLICATIONS

S. A. Myers and D. H. Tracy "Improved Performance Using Internal Standardization in Inductively-Coupled Plasma Emission Spectroscopy", *Spectrochimica Acta*, 38B, 1227–1253, Feb. 1983.

Primary Examiner—Parshotam S. Lall
Assistant Examiner—Brian M. Mattson
Attorney, Agent, or Firm—H. S. Ingham; E. T. Grimes

[57] ABSTRACT

A method and apparatus for standardizing spectral line intensities in a spectral monochromator separate an input beam into a sample spectral line characteristic of a sample element, a reference spectral line, a standard spectral line and a background spectral band. At a first point in time an intensity $I_A$ of the sample line, a first intensity $I_{R1}$ of the reference line and a first intensity $I_{B1}$ of the background band are measured. At a second point in time an intensity $I_S$ of the standard line, a second intensity $I_{R2}$ of the reference line and a second intensity $I_{B2}$ of the background band are measured. An intensity ratio IR defined by the formula $$IR = \left( \frac{I_A - I_{B1}}{I_{R1} - I_{B1}} \right) \div \left( \frac{I_S - I_{B2}}{I_{R2} - I_{B2}} \right)$$

is computed wherein the intensity ratio IR represents a standardized intensity of the sample line compensated for source fluctuations.

8 Claims, 3 Drawing Sheets

STANDARDIZATION OF SPECTRAL LINES

The present invention relates to optical spectrometers and particularly to a spectrometer and a related method for standardization of spectral line intensities.

BACKGROUND OF THE INVENTION

Various types of optical spectrometers are in use for such purposes as atomic emission spectroscopy, atomic absorption spectroscopy and astronomy. A complete system generally consists of a source of radiation, a spectrometer for separating and detecting individual spectral components, and a data station for processing the information from the spectrometer. The radiation source, for example, may be a system for injecting a test sample into an inductively coupled plasma where the atomic species in the sample are excited to radiate characteristic atomic emission. As another example, a sample is evaporated in a graphite furnace where the gaseous sample absorbs certain frequencies of the incident radiation to provide atomic absorption lines. Similarly, astronomical sources provide atomic emission and absorption lines.

A type of spectrometer of particular interest herein involves sequential measurement utilizing a monochromator in which a grating or prism is rotated to direct a narrow portion of the spectrum to a detector. The angle is adjusted to correspond to the different emission (or absorption) lines of the elements. A single detector is used, either a solid state detector or a photomultiplier tube. The measurement process involves rotation of the grating with measurements at a fixed location corresponding to grating angles appropriate to the atomic emission lines.

Sophisticated monochromators, particularly of the type used for quantitative analysis of atomic elements in samples injected through an induction coupled plasma, are controlled by microprocessors and personal computers. Such a system is typified by a Model Plasma II emission spectrometer sold by The Perkin-Elmer Corporation, Norwalk, , and described in U.S. Pat. No. 4,779,216 by Collins, assigned to the assignee of the present application. A stepper motor orients a grating with respect to the slit of the detector to locate any selected portion of the spectrum for measurement of the intensity of that portion. A dedicated microprocessor provides suitable signals to the motor for selective orientation in relation to wavelength. The microprocessor also receives the intensity signal from the detector, and provides data in the form of spectral intensity vs. spectral position. In practice, scanning signals are provided to the motor to sequentially scan the spectrum in a series of steps.

In order to allow a reasonably fast scan, signals to the motor are such as to scan in spectral windows which are just wide enough to encompass each of the selected spectral bands with some margin. The motor scans through all steps in a window, and then moves quickly to the next window before scanning in steps again, and on to the next window, etc., for the whole series of spectral bands.

Calibration of the instrument typically is accomplished by running a standard element of known concentration, and a background or blank run with no sample before running the unknown samples. This provides two points for the calibration.

For further accuracy, it is necessary to compensate for fluctuations in the source, such as variations in the amount of sample material injected into a source plasma. For this purpose, standardization is generally effected by measuring intensity of a spectral line of a reference element added in a known quantity in the source. During each run, or selectively between the runs for unknown elements in a sample, an intensity of a reference spectral line is determined. A ratio of a sample line intensity to that of the reference line provides a standardized measure of intensity and thereby quantity of the unknown atomic species. This method, which has been in extensive use for many years, is sequential standardization. A detrimental problem is that results are susceptible to interference from extraneous radiation as from electrolytes added to sample liquids injected into the plasma. In such case, recovery, i.e. measured intensity, may be unpredictably low.

An alternative standardization method was refined by Myers and Tracy as reported in "Improved Performance using Internal Standardization in Inductively-coupled Plasma Emission Spectroscopy" by S. A. Myers and D. H. Tracy, *Spectrochimica Acta*, 38B, 1227-1253 (1983). Known as simultaneous standardization, the method involves splitting out a fraction of the input beam from the source. This split portion is further split, and one half is used for measurement of a standard line intensity. The other half is used for measurement of background radiation which is subtracted from the standard and sample line intensities. A "Myers-Tracy" ratio is calculated as the ratio of the corrected intensities of the sample and the standard. This standardization method has significantly improved average accuracy (recovery), since the compensation measurements are made simultaneously, and is used in the Perkin-Elmer Plasma II. However, there often is a considerable scatter in individual results, i.e. poor accuracy.

Therefore an object of the present invention is to provide a novel method and an apparatus for standardizing spectral line intensities to improve compensation for source fluctuations. A further object is to provide a novel method with an optical spectrometer for effecting spectral measurements having improved recovery and accuracy. Another object is to provide an improved optical spectrometer for achieving high accuracy and precision in quantitative measurements for atomic elements.

SUMMARY OF THE INVENTION

The foregoing and other objects are achieved by a method of standardizing spectral line intensities in an optical spectrometer including radiation means for generating an input beam having a background radiation and being characteristic of a plurality of atomic elements including a sample element, a reference element and a standard element; separation means for separating the input beam into a simple spectral line characteristic of the sample element, a reference spectral line characteristic of the reference element, a standard spectral line characteristic of the standard element, and a background spectral band of the background radiation; and measuring means for measuring intensity of each of the spectral lines and the background band.

The method comprises introducing into the radiation means a sample element, a reference element and a standard element such as to provide, respectively, a sample spectral line, a reference spectral line and a standard spectral line, and to further provide a background band; measuring at a first time an intensity $I_A$ of the sample line, a first intensity $I_{R1}$ of the reference line and a first intensity $I_{B1}$ of the background band; measuring at a second time an intensity $I_S$ of the standard line, a second intensity $I_{R2}$ of the reference line and a second intensity $I_{B2}$ of the background band; and computing an intensity ratio IR defined by the formula $$IR = \left( \frac{I_A - I_{B1}}{I_{R1} - I_{B1}} \right) \div \left( \frac{I_S - I_{B2}}{I_{R2} - I_{B2}} \right)$$

The intensity ratio IR represents a standardized intensity of the sample line compensated for source fluctuations. The background intensities may be omitted if insignificant.

The objectives are further achieved by an optical spectrometer comprising radiation means for generating an input beam characteristic of background radiation and of a plurality of atomic elements including a sample element, a reference element and a standard element. Seperation means separate the input beam into a sample spectral line characteristic of the sample element, a reference spectral line characteristic of the reference element, a standard spectral line characteristic of the standard element, and a background spectral band of the background radiation. First measuring means measure at a first time an intensity $I_A$ of the sample line, a first intensity $I_{R1}$ of the reference line and a first intensity $I_{B1}$ of the background band. Second measuring means measure at a second time an intensity $I_R$ of the reference line, a second intensity $I_{R2}$ of the reference line and a second intensity $I_{B2}$ of the background band. Computing means compute an intensity ratio IR defined by the formula $$IR = \left( \frac{I_A - I_{B1}}{I_{R1} - I_{B1}} \right) \div \left( \frac{I_S - I_{B2}}{I_{R2} - I_{B2}} \right)$$

The intensity ratio IR represents a standardized intensity of the sample line compensated for source fluctuations. The background intensities may be omitted if insignificant.

According to a preferred embodiment, the separating means comprises splitting means and optical dispersion means. The splitting means is for splitting the input beam into a primary beam characteristic of the sample element and the reference element, a standard beam comprising the standard spectral line and a background beam comprising the background spectral band.

The optical dispersion means is receptive of the primary beam for producing a series of spectral lines comprising the sample line and the reference line. The optical dispersion means further comprises scanning means for directing the sample line and the standard line sequentially to a detector.

DETAILED DESCRIPTION OF THE INVENTION

Figure 1:
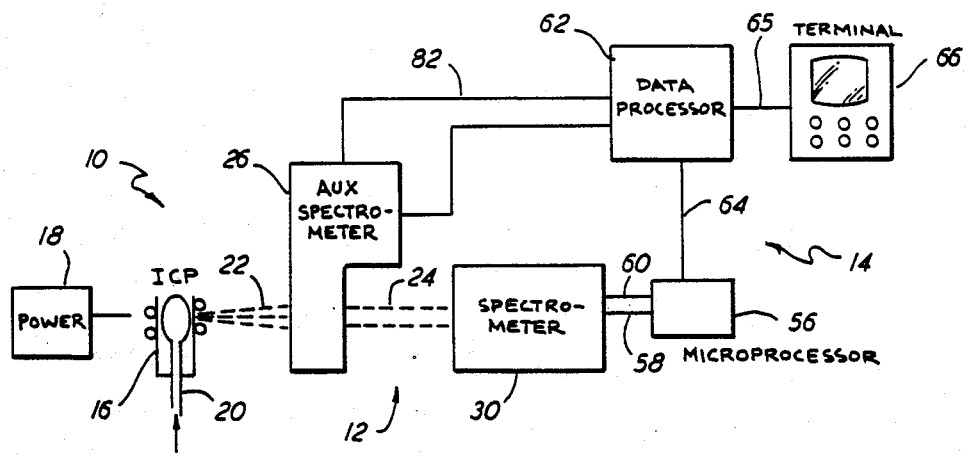
FIG. 1 is a block diagram of an optical spectrometer system for carrying out the present invention.

A spectrographic system for carrying out the present invention to compensate for source fluctuations is shown in the block diagram of FIG. 1. For purposes of illustration herein, the system is of a type comparable to the aforementioned Perkin-Elmer Plasma II emission spectrometer. There are, broadly, three subsystems, namely, a source of radiation 10, an optical spectrometer 12, and a data processor 14.

Radiation source 10 produces infrared, visible and/or ultraviolet radiation generally characteristic of atomic elements. The source may be, for example, an inductively coupled plasma (ICP) 16, driven by a power supply 18, into which a sample comprising test material (analyte) in a matrix solution is injected by a sample injector 20. Alternatively the source may be a graphite furnace or the like operating to provide emission lines or absorption lines of atomic elements, or extraterrestrial with light being collected by an astronomical telescope.

Sample injector 20 injects into the plasma a mixture of a sample (e.g. unknown) material for analysis, a selected standard atomic element in a known concentration, and a selected reference atomic element. The standard element is conventionally scandium or another element having atomic spectral lines that are unlikely to interfere with atomic lines to be measured for the sample and reference elements.

The reference is chosen to have similar spectral characteristics to the expected sample material; for example lanthanum (202.548 nm) is a good reference element for measuring for manganese. Thus an input beam 22 from the source is characteristic of a plurality of atomic elements including the sample, reference and standard.

Figure 2:
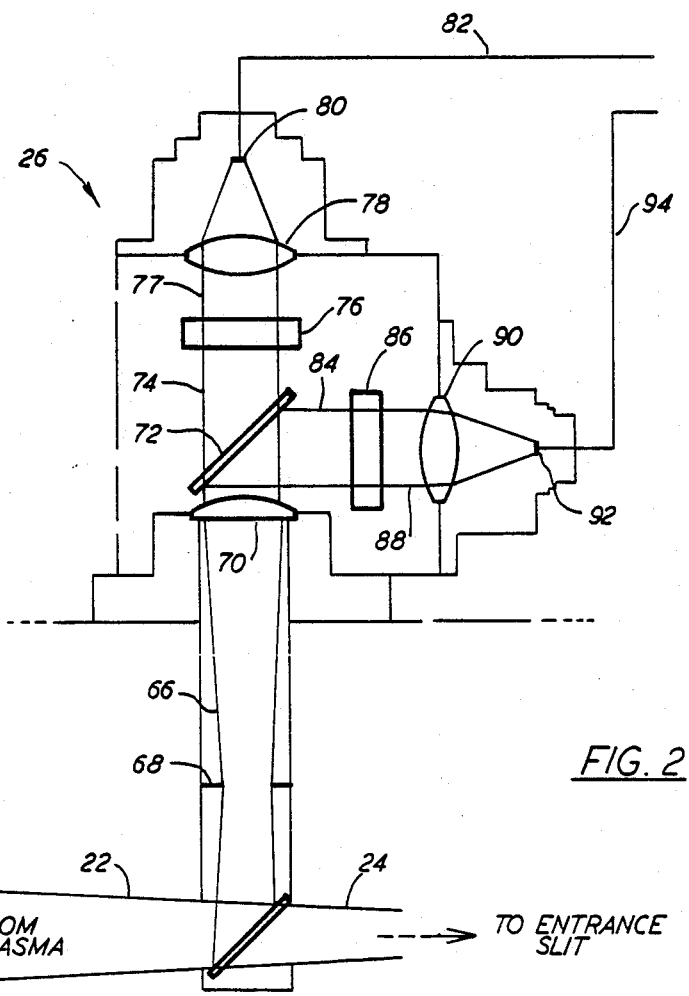
FIGS. 2 and 3 are schematic drawings of components of FIG. 1.

A primary beam 24 passes through an auxilliary spectrometer 26 shown in detail in FIG. 2. The input beam 22 from source 10 is split with an uncoated quartz plate 28 having about 5% reflectance. The reflected 5% beam is directed further into auxilliary spectrometer 26. The 95% portion passing through the plate constitutes primary beam 24 that is directed to a conventional spectrometer 30 such as a spectral monochromator, shown further in FIG. 3.

The primary beam 24, which is characteristic of at least the sample elements and the reference element, passes through an entrance slit 31 and rays 32 are reflected by a concave collimator 34 to a reflective holographic diffraction grating 36. Dispersed rays 40 reflected in a spectral pattern from the grating are passed to a concave spherical reflector 42 which focuses the rays through an exit slit 50 to a detector 51. The detector is preferably a photomultiplier tube for maximum sensitivity, although a solid state detector may be used.

Figure 3:
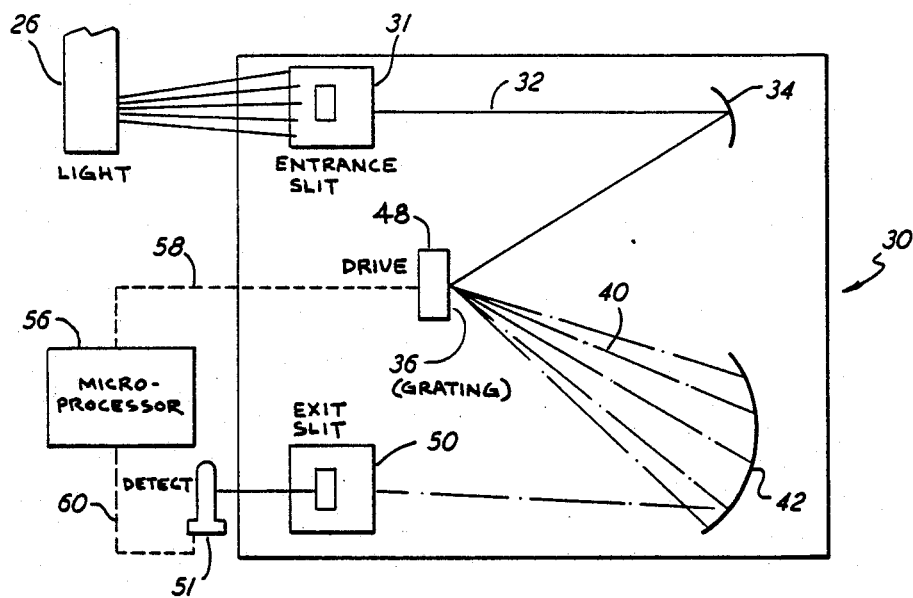
Figure 4:
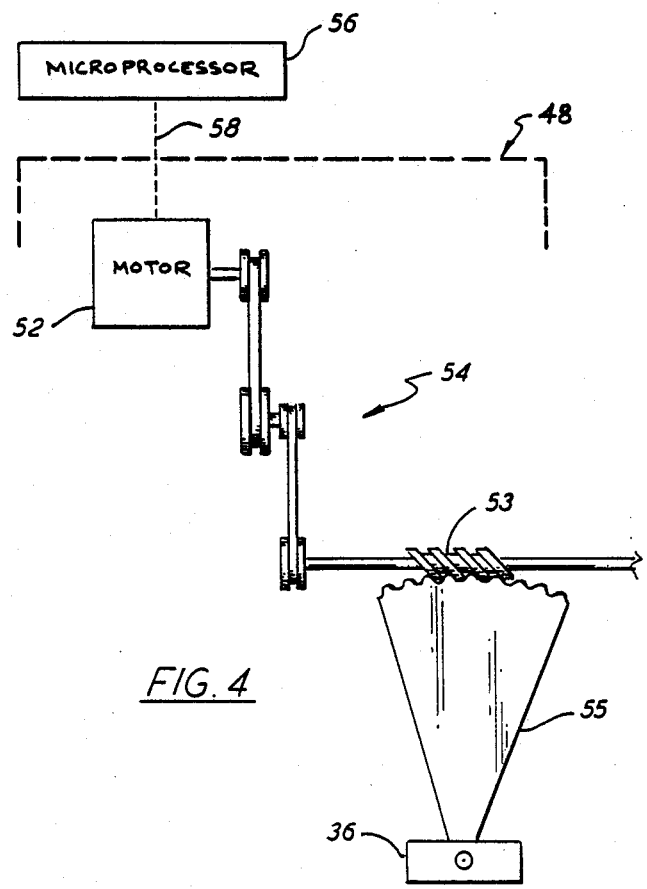
FIG. 4 is a schematic drawing of a drive assembly component of FIG. 3.

A drive assembly 51 is operatively connected to rotate the grating as shown in further detail in FIG. 4. A small motor 52 turns a worm gear 53 via a set of pulleys and belts 54. Worm gear 53 repositions sector gear 55 and, thereby, diffraction grating 36. The stepper motor thus orients grating 36 with respect to detector means 50,51 (FIG. 3) to locate any selected portion of the spectrum for measurement of the intensity of the selected portion. A dedicated microprocessor unit 56 provides suitable signals on a conductor 58 to the motor for orientation. The microprocessor also receives the intensity signal on a conductor 60 from detector 51, and provides output signal data in the form of spectral intensity vs spectral position of each line programmed into the computor for selection.

Spectral position is fundamentally wavelength (or frequency) but for purposes of internal computations and control is conveniently the step position of the motor. The selected spectral lines are those that are characteristic of the sample and of the reference elements.

Referring back to FIG. 1, to provide for further control and also to implement the present invention as described hereinbelow, a second data processing unit 62 such as a personal computer (PC) is programmed for further processing of the information on intensity and position. The PC communicates with microprocessor 56 via bus 64 and, via a further bus 65 as required, is connected to (or includes) an interfacing unit such as a terminal with a monitor and a keyboard. The PC 62, terminal 66 and microprocessor 56 collectively constitute data processor 14, which alternatively may be a single computer or part of a central system to effect the required data processing, and is also broadly termed "computer" herein.

Referring again to FIG. 2, in the auxiliary spectrometer 26 the 5% reflected beam passes as a secondary beam 66 through a field stop aperture 68 and a field stop lens 70 to a 50% beam splitter 72 consisting of a quartz plate with a thin coating of aluminum thereon. Half of the beam continues as a secondary reference beam 74 through a first interference filter 76 that passes only a selected scandium line 77, such as 424.683 nm. A first lens 78 focusses the scandium line onto a first photodetector 80 which outputs on a conductor 82 a reference signal to the PC 62 (FIG. 1) representing the intensity of the reference line.

The other half 84 of the secondary beam 66 is reflected by splitter 72 through a second interference filter 86 for passing a selected background band 88. For example if the ICP is generated with argon gas an argon band of 419-420 nm is selected. After a second focusing lens 90 a second photodiode 92 receives the band on a conductor 94 to PC 62 (FIG. 1) and generates a background signal representing the intensity of the background.

It will be appreciated that other means may be used to separate and detect the standard line and the background band. For example a dispersing element may be used in place of the splitter and filters. Also auxiliary spectrometer 26 may be separated from the optics of the main spectrometer 30 and receive radiation directly from the source from another angle, although the system shown is generally more accurate. Whatever system is used, the intensities of the line and the band should be determined substantially simultaneously with each other and with measurements being made with the primary spectrometer 30.

Although all measurements may be made at the same time, according to a preferred embodiment and the present example, a spectral monochronometer 30 such as depicted in FIG. 3 scans lines across a detector to measure standard and sample lines sequentially. The order is not important to the present invention. For convenience and efficiency a line for the standard element is designated to the computer and preferably measured first and the data is stored in the computer, and then a scanning run is made to measure reference and sample line intensities. However, this order could be reversed, or the sample and standard lines could be all measured sequentially in a single scanning run with the stepper motor. The standard line is best measured before the sample lines, for availability of standard intensity in subsequent calculations. The following description applies to a single atomic line of a sample, although in practice a number of lines are measured and similarly processed. Also, for simplicity, intensity measurements are described although the data processing clearly deals with the corresponding electrical signals.

At a first point of time in a sequence, an intensity $I_A$ of a sample line is measured with monochromator 30. Simultaneously, with the auxiliary spectrometer 26, a first intensity $I_{R1}$ is measured for the reference line, and a first intensity $I_{B1}$ is measured for the background band. A first ratio R1 is computed, and stored in the computer memory, according to the formula $$R1 = \frac{I_A - I_{B1}}{I_{R1} - I_{B1}}.$$

At a second point of time, which may be before or after the first time, an intensity $I_S$ of the selected standard line is measured with the monochromator. Simultaneously at the second time, with the auxiliary spectrometer, a second intensity $I_{R2}$ is measured for the reference line, and a second intensity $I_{B2}$ is measured for the background band. A second ratio R2 is computed according to the formula $$R2 = \frac{I_S - I_{B2}}{I_{R2} - I_{B2}}.$$

An intensity ratio IR is then computed as R1/R2, or $$IR = \left( \frac{I_A - I_{B1}}{I_{R1} - I_{B1}} \right) \div \left( \frac{I_S - I_{B2}}{I_{R2} - I_{B2}} \right)$$

This ratio is then conventionally related to atomic concentration via the calibration. In practice R1 and R2 may be stored until the end of a series of runs, and then all IR calculations made to provide the data on concentration.

It is desirable to correct for background as indicated above. However, it is not necessary under the present invention to measure or compute the background correction if the background is deemed to be insignificant. Thus the intensity ratio may be presented more broadly as $$IR_O = \left( \frac{I_A}{I_{R1}} \right) \div \left( \frac{I_S}{I_{R2}} \right)$$

For comparison of results, the ratio R1 will be recognized as a conventional Myers-Tracy internal standardization ratio using simultaneous measurements. For further comparison, a ratio RS may be computed as representing an alternative conventional standardization using sequential measurements:

$$RS = \frac{I_A - I_{B1}}{I_S - I_{B2}}$$

The TABLE herein sets forth comparative results for four levels of compensation for source fluctuations. Data are presented for a calcium line and a manganese line, the calcium being 10 ppm and the manganese 10 ppm in a 2% NaCl water solution injected into an argon plasma. "Recovery" is the percentage of the intensity ratio relative to its theoretical value based on the actual amount in the solution. Precision (±) is determined from the spread in results over 5 runs.

TABLE

| RECOVERY AND PRECISION OF Ca and Mn in 2% NaCl | | |
|---|---|---|
|  | Ca 393.366 | Mn 257.610 |
| No Correction | 86.2 ± 3.1 | 75.7 ± 4.4 |
| Internal Std. | 102.8 ± 4.4 | 99.1 ± 5.4 |
| Sequential Std. | 98.5 ± 0.7 | 93.0 ± 0.4 |
| Present Invention | 100.0 ± 0.7 | 100.9 ± 1.0 |

The data show that "No Correction" and "Sequential Standardization" each result in erroneously low measurement calculations. The reason is considered to be interference from the electrolyte (herein NaCl) which is typically added to simulate actual samples containing electrolytes. The data also show relatively poor precision for "no correction" and "internal standardization".

The present invention, however, yields very good results in both recovery and precision. These results are especially surprising because typical experience with multiple calculations for physical processes is loss of accuracy and precision, not improvement.

Although the foregoing calculations of ratios are quite simple, the invention is especially suited for a spectrographic system that is automated by computer, e.g. the Perkin-Elmer Plasma II spectrometer. The calculations are readily integrated into an existing computer program used for calculating standardized intensities.

Figure 5:
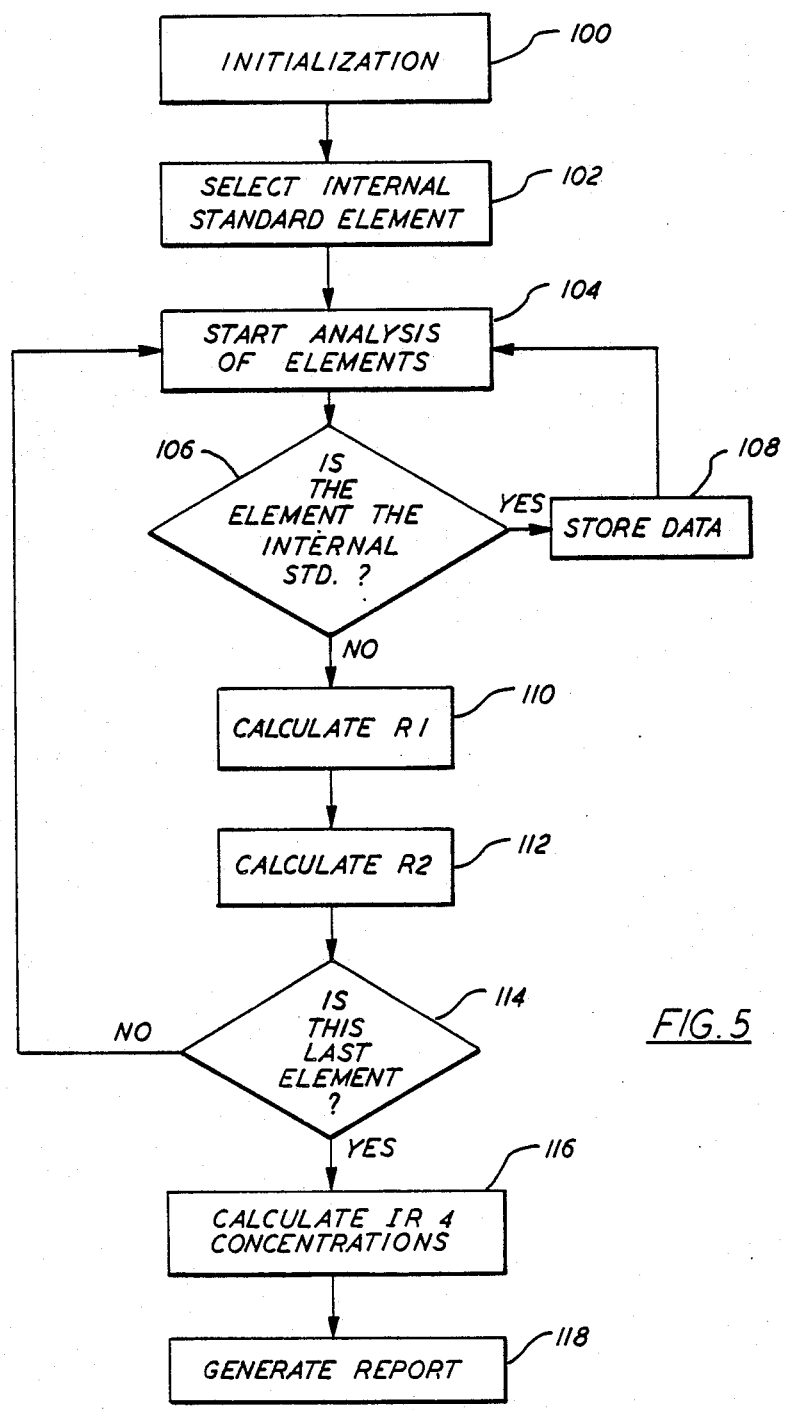
FIG. 5 is a flow chart of a program for carrying out the invention.

FIG. 5 is an illustrative flow sheet of the method and means for carrying out the invention with the computer program. After initialization (100), the operator selects an internal standard element (102) and starts the analysis sequence (104). The program queries whether a run is made on the standard (106), generally the first run. If "yes", the standard data is stored and the analysis is repeated on the next element (104). When the run is not on the standard, successive calculations are made for the ratio R1 (110) and the ratio R2 (112). Unless the run is on the last element (114), the program returns to analysis of a next element (104) to repeat the process. When the runs are completed, the final ratios IR for the elements are made (116) and a report is generated (118).

The software illustrative of the type needed to achieve the optimization and perform the method steps as set forth herein is in the C-language operating under a copyrighted software operating system known as IDRIS developed by, and commercially available from, Whitesmiths Ltd., of Concord, Mass. The listing may be compiled on a Perkin-Elmer Model 7500 computer, and will operate in the manner herein described above. Other similar computers may be utilized as well and other programs can easily be developed in other programming languages to accomplish the same functions.

The foregoing discussion has been made with particular emphasis upon a preferred embodiment therefor which utilizes a particular form of instrument for chemical analysis namely, the inductively coupled plasma spectrometer. Those of skill in the art, however, will recognize that the principles of the present invention may be applied equally to the operation of various other instruments for chemical analysis. The foregoing and other modifications to the apparatus according to the present invention may be made by those of skill in the art without departing from the spirit and scope of the present invention as defined by the following claims.

What is claimed is:

1. A method of standardizing spectral line intensities in an optical spectrometer including:

radiation means for generating a spectral input beam characteristic of a plurality of atomic elements including a sample element, a reference element and a standard element; separation means for separating the input beam into a sample spectral line characteristic of the sample element, a reference spectral line characteristic of the reference element, and a standard spectral line characteristic of the standard element; and measuring means for measuring intensity of each of the spectral lines;

the method comprising:

introducing into the radiation means a sample element, a reference element and a standard element such as to provide, respectively, a sample spectral line, a reference spectral line and a standard spectral line;

measuring at a first time an intensity $I_A$ of the sample line and a first intensity $I_{R1}$ of the reference line;

measuring at a second time different than the first time an intensity $I_S$ of the standard line and a second intensity $I_{R2}$ of the reference line;

computing an intensity ratio $IR_O$ defined by the formula $$IR_0 = \left( \frac{I_A}{I_{R1}} \right) \div \left( \frac{I_S}{I_{R2}} \right)$$

wherein the intensity ratio $IR_O$ is representative of a standardized intensity of the sample line compensated for source fluctuations.

2. A method of standardizing spectral line intensities in an optical spectrometer including:

radiation means for generating a spectral input beam having a background radiation and being characteristic of a plurality of atomic elements including a sample element, a reference element and a standard element;

separation means for separating the input beam into a sample spectral line characteristic of the sample element, a reference spectral line characteristic of the reference element, a standard spectral line characteristic of the standard element, and a background spectral band of the background radiation; and measuring means for measuring intensity of each of the spectral lines and the background band;

the method comprising:

introducing into the radiation means a sample element, a reference element and a standard element such as to provide in the spectrometer respectively, a sample spectral line, a reference spectral line and a standard spectral line and to further provide a background spectral band;

measuring at a first time an intensity $I_A$ of the sample line, a first intensity $I_{R1}$ of the reference line and a first intensity $I_{B1}$ of the background band;

measuring at a second time different than the first time an intensity $I_S$ of the standard line, a second intensity $I_{R2}$ of the reference line and a second intensity $I_{B2}$ of the background band; and computing an intensity ratio IR defined by the formula $$IR = \left( \frac{I_A - I_{B1}}{I_{R1} - I_{B1}} \right) \div \left( \frac{I_S - I_{B2}}{I_{R2} - I_{B2}} \right)$$

wherein the intensity ratio IR is representative of a standardized intensity of the sample line compensated for source fluctuations.

3. The method according to claim 2 wherein the separating means comprises:

splitting means for splitting the input beam into a primary beam characteristic of the sample element and the reference element, a standard beam comprising the standard spectral line and a background beam comprising the background spectral band; and optical dispersion means receptive of the primary beam for producing a series of spectral lines comprising the sample line and the reference line.

4. An optical spectrometer comprising:

radiation means for generating a spectral input beam characteristic of a plurality of atomic elements including a sample element, a reference element and a standard element;

separation means for separating the input beam into a sample spectral line characteristic of the sample element, a reference spectral line characteristic of the reference element, and a standard spectral line characteristic of the standard element;

first measuring means for measuring at a first time an intensity $I_A$ of the sample line and a first intensity $I_{R1}$ of the reference line;

second measuring means for measuring at a second time different than the first time an intensity $I_S$ of the standard line and a second intensity $I_{R2}$ of the reference line;

computing means responsive to the first and second measuring means for computing an intensity ratio IR defined by the formula $$IR_0 = \left( \frac{I_A}{I_{R1}} \right) \div \left( \frac{I_S}{I_{R2}} \right)$$

wherein the intensity ratio $IR_O$ is representative of a standardized intensity of the sample line compensated for source fluctuations.

5. An optical spectrometer comprising:

radiation means for generating a spectral input beam having a background radiation and being characteristic of a plurality of atomic elements including a sample element, a reference element and a standard element;

separation means for separating the input beam into a sample spectral line characteristic of the sample element, a reference spectral line characteristic of the reference element, a standard spectral line characteristic of the standard element, and a background spectral band of the background radiation;

first measuring means for measuring at a first time an intensity $I_A$ of the sample line, a first intensity $I_{R1}$ of the reference line and a first intensity $I_{B1}$ of the background band;

second measuring means for measuring at a second time different than the first time an intensity $I_S$ of the standard line, a second intensity $I_{R2}$ of the reference line and a second intensity $I_{B2}$ of the background band; and computing means responsive to the first and second measuring means for computing an intensity ratio IR defined by the formula $$IR = \left( \frac{I_A - I_{B1}}{I_{R1} - I_{B1}} \right) \div \left( \frac{I_A - I_{B1}}{I_{R2} - I_{B2}} \right)$$

wherein the intensity ratio IR is representative of a standardized intensity of the sample line compensated for source fluctuations.

6. The spectrometer according to claim 5 wherein the separating means comprises:

splitting means for splitting the input beam into a primary beam characteristic of the sample element and the reference element, a standard beam comprising the standard spectral line and a background beam comprising the background spectral band; and optical dispersion means receptive of the primary beam for producing a series of spectral lines comprising the sample line and the reference line.

7. The spectrometer according to claim 6 wherein the first measuring means comprises a first primary detector receptive of the sample line, a reference detector receptive of the reference line, and a background detector receptive of the background line, and the second measuring means comprises a second primary detector receptive of the standard line and further comprises the reference detector and the background detector.

8. The spectrometer according to claim 7 wherein the second primary detector consists of the first primary detector.

* * * * *